Feb. 21, 1956    A. A. MILLARD    2,735,486
ABRASIVE DISC OR GASKET CUTTER MOUNTED
FOR ROTATION ABOUT A SPINDLE

Filed Sept. 25, 1953    3 Sheets-Sheet 1

Arnold A. Millard
INVENTOR.

BY *[signatures]*
Attorneys

Feb. 21, 1956
A. A. MILLARD
2,735,486
ABRASIVE DISC OR GASKET CUTTER MOUNTED
FOR ROTATION ABOUT A SPINDLE
Filed Sept. 25, 1953
3 Sheets-Sheet 2
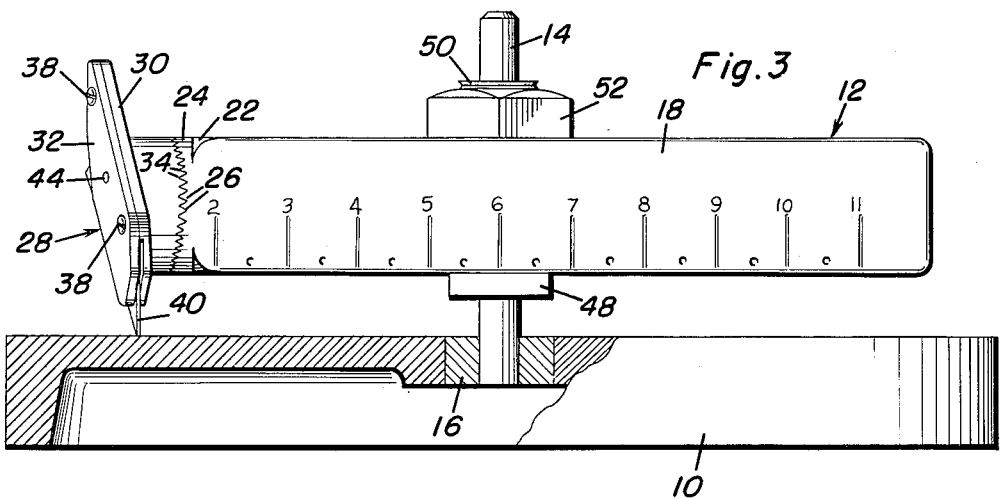
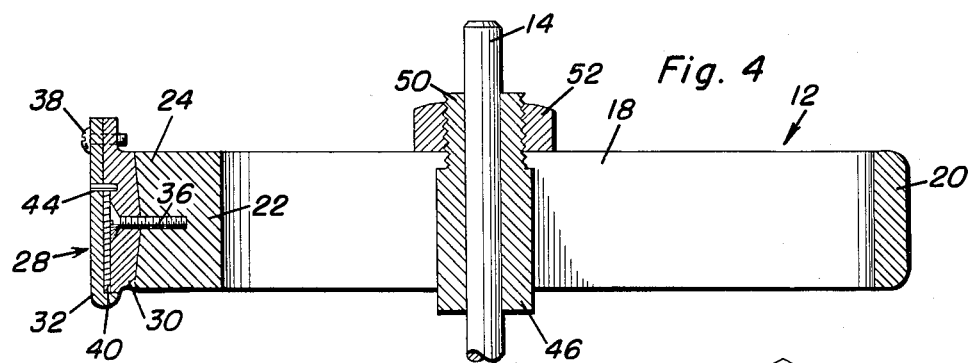
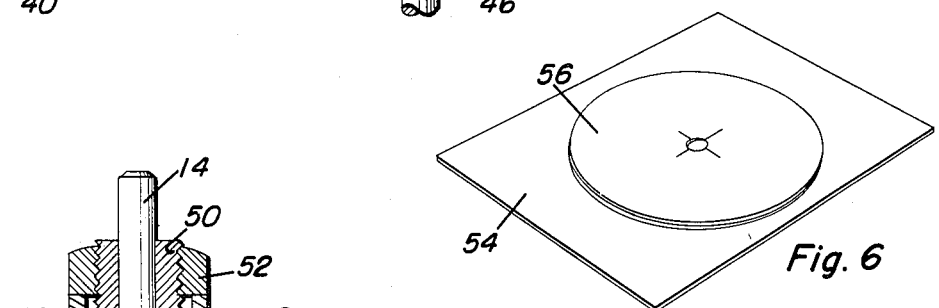
Arnold A. Millard
INVENTOR.
BY *[signatures]*
Attorneys Feb. 21, 1956 A. A. MILLARD 2,735,486
ABRASIVE DISC OR GASKET CUTTER MOUNTED
FOR ROTATION ABOUT A SPINDLE
Filed Sept. 25, 1953 3 Sheets-Sheet 3
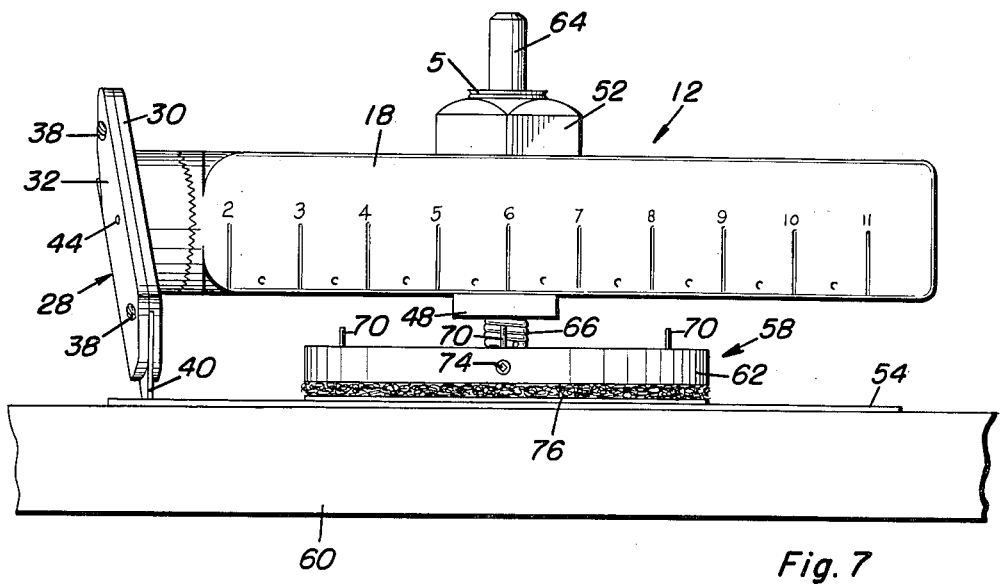
Fig. 7
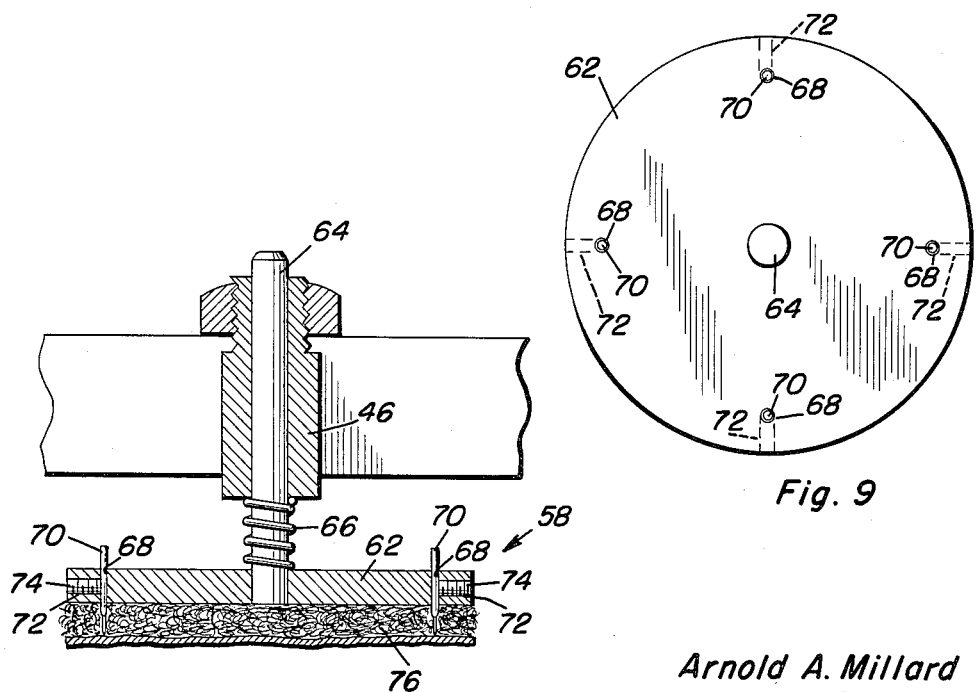
Fig. 8
Fig. 9
Arnold A. Millard
INVENTOR.
BY *Clarence A. O'Brien*
and *Harvey B. Jackson*
Attorneys

United States Patent Office 2,735,486
Patented Feb. 21, 1956

2,735,486

ABRASIVE DISC OR GASKET CUTTER MOUNTED FOR ROTATION ABOUT A SPINDLE

Arnold A. Millard, Carson City, Nev.

Application September 25, 1953, Serial No. 382,388

1 Claim. (Cl. 164—71)

This invention relates to an abrasive disc or gasket cutter and more particularly to a cutter for cutting discs from sheets of sanding paper, rubber, or the like.

An object of this invention is to provide a cutter which will cut perfect discs from sand paper, emery paper or resin bonded floor sanding paper.

Another object of this invention is to provide a cutter which will cut gaskets from rubber, leather or other material used for gaskets.

A further object of this invention is to provide a cutter wherein the cutter blade is adjustable to cut discs of various diameters.

A still further object of this invention is to provide a cutter wherein the cutter blade is adjustable to compensate for various thicknesses of the material to be cut.

A yet further object of this invention is to provide a cutter which is simple and efficient in operation and inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is a side elevational view of the preferred form of the present invention with part of the table assembly broken away showing the mounting of the spindle thereon;

Figure 4 is a sectional view taken substantially along the section line 4—4 of Figure 1;

Figure 5 is a sectional view taken substantially along the section line 5—5 of Figure 1;

Figure 6 is a perspective view showing a disc cut from a sheet of material.

Figure 7 is a side elevational view showing a different mounting member for the cutter blade holder;

Figure 8 is a vertical sectional view of the mounting member of Figure 7; and

Figure 9 is a top plan view of the mounting member of Figure 7.

Figure 1:
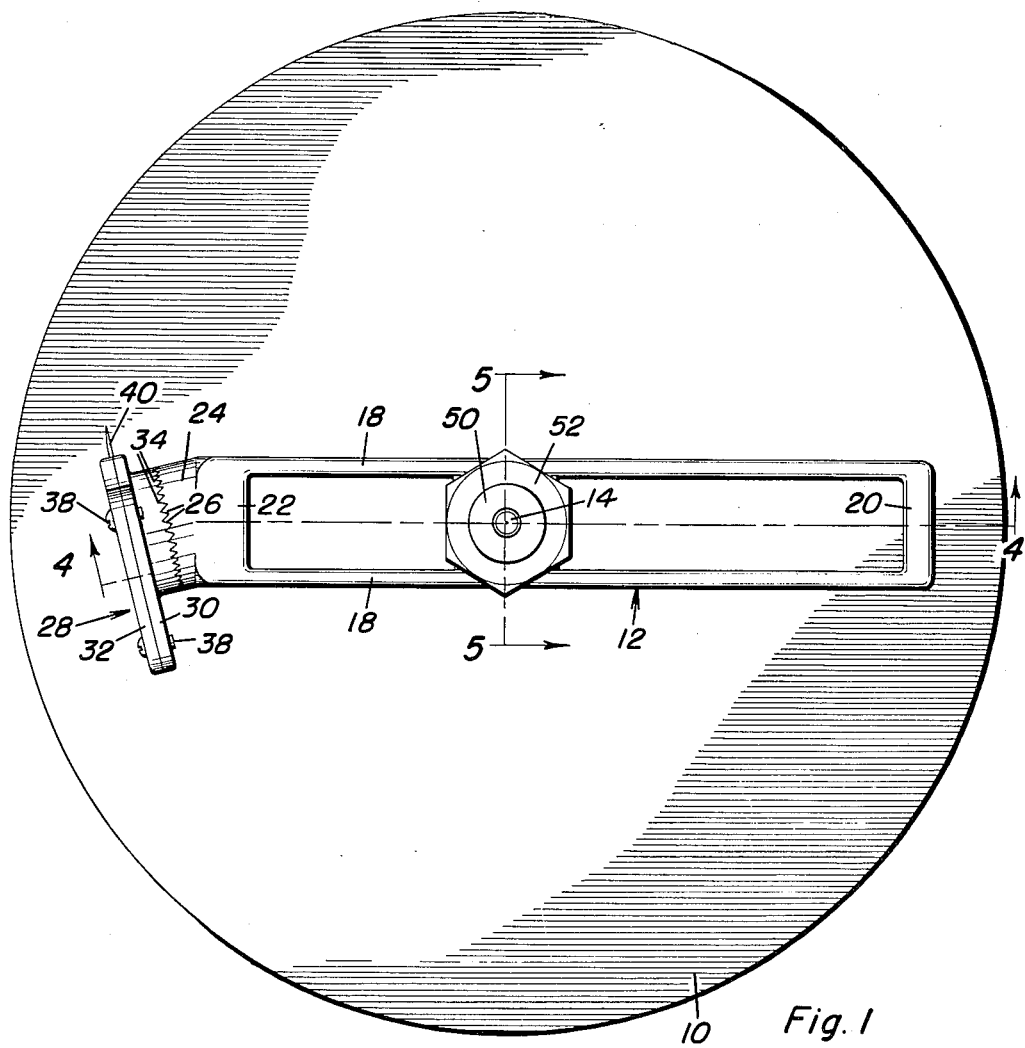
Figure 1 is a top view of the preferred form of the present invention.
Figure 2:
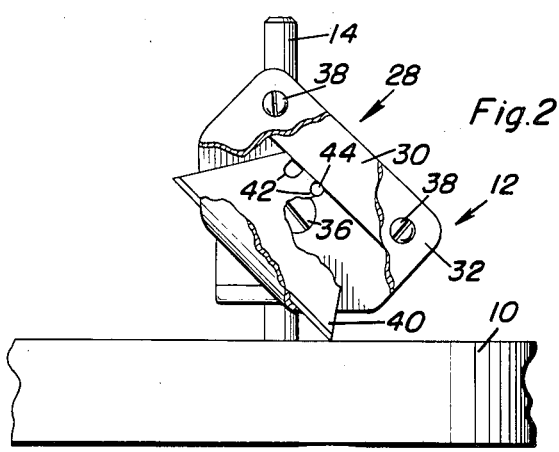
Figure 2 is an end elevational view of the preferred form of the present invention showing parts of the cutter blade holder and cutter blade removed.

Referring now more particularly to the accompanying drawings, it will be seen that the improved abrasive disc or gasket cutter forming the subject of this invention includes, as shown in Figure 1, a table 10 and a cutter blade supporting bar 12. The table 10 is formed by a flat circular metallic plate.

The table 10 is provided with a spindle 14 extending upwardly from the center of the table. The spindle 14 is suitably fixed in a bearing 16 which is embedded in and suitably fixed in the table 10.

The cutter blade supporting bar 12 is formed of a pair of longitudinal members 18 joined together in spaced apart relationship at their ends by members 20 and 22. The member 22 has an inclined face portion 24 integral therewith. The inclined face portion 24 is at an angle to the longitudinal axis of the bar 12. A plurality of serrations 26 are provided on the face portion 24 on the side away from the bar 12.

A cutter blade holder 28 is secured to the end of the bar 12 abutting the face portion 24. The cutter blade holder 28 is comprised of a back plate 30 and a front plate 32. The back plate 30 is provided with a plurality of serrations 34 which are adapted to engage with the serrations 26 on the face portion 24. A screw 36 extends through the back plate 30 and into the face portion 24 for retaining the serrations 26 and 34 in engagement with one another.

Plate 32 is held in position on the plate 30 by means of a pair of screws 38. A cutter blade 40 is disposed between the plates 30 and 32 and is retained therebetween by the clamping action of the plates. The blade 40 is provided with a series of notches 42 in one edge thereof which engage a pin 44 secured at one end in the plate 30 to prevent the blade 40 from moving out of the holder 28. The plate 32 is provided with an aperture for receiving the other end of the pin 44 for more rigidly securing the pin in position. The amount which the blade 40 extends outside the holder 28 is adjusted by positioning a desired notch 42 around the pin 44. The angle which the blade 40 will take with respect to the table 10 is adjusted by turning the holder 28 with respect to base portion 24 and then locking in the desired position.

The bar 12 is mounted on the spindle 14 by means of a bearing 46 vertically slidable and rotatable on the spindle 14 by manipulation of the bar 12. The bearing 46 has a central aperture therein which receives the spindle 14. Bearing 46 is further provided with a pair of outwardly extending flanges 48 which engage the under surface of the longitudinal members 18. The other end of bearing 46 is provided with a threaded portion 50 which receives thereon an internally threaded nut 52. The nut 52 bears against the upper surface of the members 18 thereby causing the flanges 48 and the nut 52 to frictionally engage the longitudinal members 18 for positioning the bearing along the bar 12. In this manner means are provided for adjusting the cutter blade toward and away from the spindle 14 whereby discs of various diameters can be cut.

Indicia are provided on the members 18 so as to provide a scale for adjusting the cutter blade to cut a disc of a desired diameter.

Figure 6 shows a sheet 54 of suitable material having a disc 56 cut therefrom by means of the present invention.

In the embodiment shown in Figures 7 to 9, the cutter blade supporting bar 12 is the same as in the previously described embodiment. A mounting assembly 58 is provided for using the cutter blade supporting bar 12 with a conventional bench or table 60.

The mounting assembly 58 comprises a flat circular plate 62 having a spindle 64 extending upwardly from the center thereof. A spring 66 is mounted on the spindle 64 for engaging the bottom of the bearing 46 when the bar 12 is placed in position on the spindle 64. The spring 66 will provide a resilient mounting for the bar 12.

The plate 62 is provided with a plurality of bores 68 extending therethrough adjacent the outer periphery of the plate. A needle 70 is slidably mounted in each of the bores 68 with the pointed end thereof extending in the opposite direction from the spindle 64. The needles 70 are of suitable construction and may be of the type used in phonographs.

The plate 62 is further provided with threaded bores 72 extending from the edges thereof and intersecting the bores 68. A set screw 74 is disposed in each of the bores 72 and engages the needles 70 for frictionally maintaining the needles in adjusted position.

The lower surface of the plate 62 is provided with a padding 76 through which the needles can extend. This padding will provide a greater gripping surface for engaging the material to be cut.

In practical use, the sheet of material to be cut is first provided with a hole in the center thereof and is placed on the table 10, with the grit side down in the case of sanding material, and then the bearing 46 is adjusted to the desired position along the bar 12 and mounted on the spindle 14. The bar 12 is then rotated about the spindle 14 thereby causing the blade 40 to cut through the material and upon complete rotation of the bar 12 a perfect disc will be formed. When it is desired to make a gasket the outer cut is first made and then the blade 40 moved toward the spindle the desired amount and a second cut is made thereby giving a perfect disc.

In the embodiment shown in Figures 7 to 9 it is not necessary to provide a center hole in the material to be cut. The piece of material is placed on a table or bench and the mounting member 58 is placed thereon. Then the cutter blade holder bar is adjusted to the desired position and placed on the spindle. Pressure exerted downwardly on the assembly will cause the padding to be compressed and the needles will project therethrough. The length of the needles should be adjusted so as to pass through the material to be cut and into the bench. This will firmly position the cutter and the material in position for the cutting operation.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claim.

What is claimed as new is as follows:

A cutter for abrasive discs and the like comprising a base member constituting a table for supporting the material to be cut, a spindle mounted at the center of said base member and projecting upwardly therefrom, a cutter blade supporting bar, means on said bar receiving said spindle permitting rotation of said bar around said spindle, a cutter blade secured to the end of said bar, means on said bar permitting angular adjustment of said cutter blade with respect to said bar, said last named means comprising a face portion secured to an end of said bar at an angle to the longitudinal axis of the bar, a series of serrations on said face portion on the side away from said bar lying in a plane transverse to and oblique with respect to the axis of said bar, a cutter blade holder, said holder having a series of serrations on one side thereof and means for retaining the serrations on the holder in engagement with the serrations on the face portion, at least one transverse pin in said holder, and notches in one edge of said blade engageable with said pin to adjust said blade in the holder in different longitudinally adjusted positions.

References Cited in the file of this patent
UNITED STATES PATENTS

| | | |
|---|---|---|
| 376,974 | Wunderlich | Jan. 24, 1888 |
| 1,625,081 | Haas | Apr. 19, 1927 |
| 2,134,069 | Zimmerman | Oct. 25, 1938 |
| 2,194,409 | Stanghor | Mar. 19, 1940 |